(12) United States Patent
Blettry

(10) Patent No.: US 10,866,841 B2
(45) Date of Patent: Dec. 15, 2020

(54) COMMUNICATION SYSTEM AND METHOD FOR ACCESSING AND DEPLOYING TEMPORARY MICROSERVICES ON A HETEROGENEOUS PLATFORM

(71) Applicant: WORLDLINE, Bezons (FR)

(72) Inventor: Christophe Blettry, Decines-Charpieu (FR)

(73) Assignee: WORLDLINE, Bezons (FR)

( * ) Notice: Subject to any disclaimer, the term of this patent is extended or adjusted under 35 U.S.C. 154(b) by 0 days.

(21) Appl. No.: 16/633,984

(22) PCT Filed: Jul. 24, 2018

(86) PCT No.: PCT/EP2018/070077
§ 371 (c)(1),
(2) Date: Feb. 11, 2020

(87) PCT Pub. No.: WO2019/020651
PCT Pub. Date: Jan. 31, 2019

(65) Prior Publication Data
US 2020/0218581 A1 Jul. 9, 2020

(30) Foreign Application Priority Data

Jul. 25, 2017 (FR) ..................... 17 57040

(51) Int. Cl.
*G06F 9/50* (2006.01)
*G06F 9/54* (2006.01)
*H04L 29/06* (2006.01)

(52) U.S. Cl.
CPC .......... *G06F 9/5072* (2013.01); *G06F 9/5016* (2013.01); *G06F 9/54* (2013.01); *H04L 69/163* (2013.01); *G05B 2219/32136* (2013.01)

(58) Field of Classification Search
CPC ........ G06F 9/54; G06F 9/5016; G06F 9/5072; G05B 2219/32136; H04L 69/163
See application file for complete search history.

(56) References Cited

U.S. PATENT DOCUMENTS

2014/0304810 A1  10/2014  Khanal et al.
2016/0127199 A1   5/2016  Ding et al.
(Continued)

FOREIGN PATENT DOCUMENTS

WO  2017109435 A1  6/2017

OTHER PUBLICATIONS

International Search Report from corresponding International Application No. PCT/EP2018/070077, dated Nov. 26, 2018, pp. 1-5, European Patent Office, Rijswijk, The Netherlands.

*Primary Examiner* — Azizul Choudhury
(74) *Attorney, Agent, or Firm* — Hauptman Ham, LLP

(57) ABSTRACT

The present invention relates to a communication system (1) comprising one or several execution node(s) (2) able to execute one or several microservice(s) (5), a computer device, called «host server» (3), including several routers (30) constituting an intermediate communication interface between each execution node (2) and the outside of the communication system (1), a heterogeneous computing platform (4), consisting of a set (40) of hardware and software or executable code for the access to and deployment of the microservices (5) on the system in a Java runtime environment (J) on the host server (3) and the execution nodes (2) allowing the execution of computer programs based on the Java language; the communication system (1) allows the creation of ephemeral microservices (5) by the use of a key/value system (6) stored in a distributed memory cache (8) at each creation by referencing each microservice (5) by filenames deposited in the system by a developer (10) and using an asynchronous TCP exchange protocol (T) exchang-
(Continued)

ing notifications containing metadata (M) between the host server (3) and each execution node (2); and in that each node (2) stores execution files (50) of the microservice(s) (5) including the access to the system (1) by at least one of the two entry points, either at the host server (3) or at the execution node (2) and at least one classloader (7) ensuring the deployment of the services associated with the microservices (5) that are integrated into the execution node (2).

20 Claims, 2 Drawing Sheets

(56) References Cited

U.S. PATENT DOCUMENTS

2016/0344846 A1 11/2016 Guo et al.
2018/0039494 A1* 2/2018 Lander ................ H04L 63/0815

* cited by examiner

COMMUNICATION SYSTEM AND METHOD FOR ACCESSING AND DEPLOYING TEMPORARY MICROSERVICES ON A HETEROGENEOUS PLATFORM

TECHNICAL FIELD OF THE INVENTION

The present invention relates to the field of communication systems and more particularly to the improved access to and deployment of the microservices, based on the Java language, on a heterogeneous platform. The present invention also relates to a method for accessing and deploying microservices on a heterogeneous platform by this communication system.

TECHNOLOGICAL BACKGROUND OF THE INVENTION

A problem in the field of the communication systems relates to the reliability of the system on the access to and deployment of the ephemeral microservices on a heterogeneous computing platform.

In the early days of computer science, the communication between computer machines required an in-depth knowledge of the network protocols and network hardware. Object-oriented programming (OOP consisting in the definition and the interaction of software bricks or computer application called objects) has enabled the development of the architectures of a computer environment or of the networks, called distributed architectures, by providing high-level libraries (or collections of routines encapsulating sequences of instructions) to make objects distributed on different machines communicate together so as to ease the work of the programmers and optimize the availability of the resources on the machines of a network. The microservices can be defined as libraries or code modules and can constitute a functional unit comprising a known entry point and forming an assembly, for example, with an operating system, a computing platform, a framework (software structure) or a runtime environment. Each microservice is an autonomous and independent process which may not depend on other microservices. With the evolution of the Internet of Things (IoT) and the machine-to-machine communication (M2M), the use of microservices allows the developers or programmers and operators to develop, deploy and manage self-adaptive applications, for example, on a computation platform that meets the needs of many application scenarios, by using a language (e.g. Java) supported by the computation platform and by using the standard runtime environment and the resources provided by this computation platform. Thus, instead of launching several instances of the application server, a given microservice can be load-increased on demand. This increases the value of the underlying infrastructure of a computer service, which no longer requires provisioning new virtual machines, it suffices to provision new instances of microservices on the existing machines.

It is known from the prior art, generally pay commercial computation platforms (such as Amazon Lambda, Azure functions, Google Functions or Iron.io) or a single free solution (OpenWhisk). For example, Amazon Lambda is a computer service that allows executing a code without requiring provisioning or managing the servers. It executes the code only when necessary and adapts automatically. The computation time required to execute the code and the distributed requests are billed on a usage-basis by this service and the user cannot connect to the computation instances or customize the operating system or the runtime environment, because this computer service performs the operational and administrative activities in place of the user (in particular the deployment of the code, the adaptation of the capacity, the verification of the state of the instances or the application of the security patches). These solutions are generally pay solutions or require a base platform which is complex to implement with non-interchangeable components. In addition, the access protocols from the internet are not very diversified.

It also known from the prior art a communication system and method improving the access to the electronic services available via a telecommunication network, such as for example described in the document U.S.2003154265. This document, which deals with the deployment of temporary services on a telecommunication platform, mentions the use of a cache system in which the services are archived in a Jar file format and then loaded by a Jar file loader. The method comprises the construction of an electronic packet, in the Jar format, including the code and the data necessary for the execution of the service and the cache control information; as well as the transmission of the packet to a caching device to cache the service relative to the cache control information. However, this communication system does not allow referencing the temporary services so as to facilitate the identification and deployment of the services on an on-demand request. In addition, this system cannot be adapted or set up to develop and deploy ephemeral microservices, in particular because the microservices cannot be loaded or reloaded without interruption of service and without causing impact on the used resources.

It is also known from the prior art a method for dynamically allocating multimedia server resources using a WebRTC (Web Real-Time Communications) system to allow browser-to-browser communication between a mobile telephone not having the WebRTC technology and a client mobile device having this technology, in particular for video call or multimedia sharing, such as for example described in the document U.S. 2016/127199 A1. The allocation method comprises microservices in a signaling server and the receipt of a call message by a first one of the microservices. The call message comprising an identifier specifying a target is transmitted by the first microservice towards a cache with a request for information on the capacity of the target. The cache is configured to retrieve the target capacity information by using the identifier. Then, the method consists in sending, by the first of the microservices, a request for media resources to a service directory server operatively coupled to a plurality of multimedia servers when the target capacity information indicate that the target is not capable of communicating by a browser and consists in initiating, by the first of the microservices, browser-to-browser communications between the client and the target when the target capacity information indicate that the target is capable of browser-to-browser communications. However, the method for allocating this document only allows the delivery of media (audio and/or video) content and cannot be adapted for the deployment of any type of content (other than the media content). The microservices described in this document have the disadvantage of executing only a limited number of types of action (for example, accessing a cache, sending a resource request towards a directory service or initiating a browser-to-browser communication). Furthermore, several operating modules (at least four modules, such as a WebRTC load balancer, a signaling server, a service discovery server and media servers) are required to implement the method and complicate the access to and deployment of microservices.

In this context, it is interesting to propose a solution that allows overcoming some drawbacks of the prior art by facilitating and improving the access to and deployment of ephemeral microservices on a heterogeneous computing platform.

GENERAL DESCRIPTION OF THE INVENTION

The present invention aims at overcoming some drawbacks of the prior art by proposing a new communication system, making access to and deployment of ephemeral microservices on a heterogeneous computing platform easier and more reliable.

To this end, the present invention relates to a communication system comprising one or several execution node(s) able to execute one or several microservice(s), a computer device, called «host server» (or «hub»), including several routers constituting an intermediate communication interface between each execution node and the outside of the communication system, a heterogeneous computing platform, consisting of a set of hardware and software or executable code for the access to and deployment of microservices on the system in a Java runtime environment on the host server and the execution nodes allowing the execution of the computer programs based on the Java language; the communication system allows the creation of ephemeral microservices by the use of a key/value system stored in a distributed memory cache at each creation by referencing each microservice by filenames deposited in the system by the developer and using an asynchronous TCP (Transmission Control Protocol) exchange protocol exchanging notifications containing metadata between the host server and each execution node; and in that each node stores execution files of the microservice(s) including the access to the system by at least one of the two entry points either at the host server or at the execution node and at least one classloader ensuring the deployment of the services associated with the microservices that are integrated into the execution node.

According to another feature, the exchanges of information between the host server and the execution nodes use metadata-type data comprising one or several of the following elements: an alias of the microservice (called key), a location path of a particular method in the microservice, an action associated with the location path, a microservice execution return code and a microservice execution content type.

According to another feature, a microservice development tool constitutes a developer interface and a sending tool in the protocol used between the microservice and the host server.

According to another feature, each execution node further comprises computer means for managing the microservices, computer means for reading and writing the execution files disposed in a distributed storage unit of the system, and a system for publishing and subscribing a message when a microservice is deposited or an alias is modified by the developer on the system.

According to another feature, each execution node is able to execute a predetermined algorithm dedicated to the selection of one or several execution node(s) of the microservice by determining a score (or value) then by storing the address or alias of the microservice and this score (which can be defined by the key/value system) in the distributed memory cache if the score is more relevant than the previous one.

According to another feature, the predetermined algorithm is provided to launch an inactivity timeout (load inactivity timeout) at each score determination so that the host server can reuse the same execution node as long as the microservice is unused or an inactivity timeout is lifted.

According to another feature, once the execution node has been chosen, the node called by the system loads the microservice in a new classloader, the system references this classloader in a HashMap (an example key/value system, i.e. it is a collection or a dictionary associating a key with a value) of the distributed memory cache according to the alias used in the standardized exchange message.

According to another feature, each selected execution node is able to report data in the form of a score and an address allocation in a distributed memory cache of the communication system allocated to each microservice so that the host server can read and use these data.

According to another feature, the routers of the host server use Java and Netty-based applications to ensure multiprotocol communications to the outside of the system and asynchronous TCP protocol exchanges towards the execution nodes of the system.

According to another feature, the system stores the microservices in the Jar or Javascript format and the system dearchives the Jar format files into use or execution classes to make them accessible to the classloader of the Java runtime environment of the execution node which loads these microservices from the distributed storage unit according to the request of the host server (defined by the service alias which allows identifying the microservice to be loaded), the path of the incoming request allowing to identify the method (java or javascript) to call in the loaded microservice, and the other file formats are stored unitarily on the key/value system so that the Java runtime environment can read or use the data as needed.

According to another feature, the system is able to select an execution node so that it loads a microservice in a classloader which is referenced in the distributed storage unit according to the alias used in the exchange metadata.

According to another feature, the use of a microservice is activated by at least one access code disposed either at the level of the service allowing the access to all the resources of the service, or at the level of a resource of the service allowing the access to this single resource, or by at least one access method predefined by a security manager of the communication system.

According to another feature, the host server uses and reuses the same execution node as long as the microservice is unused or a load inactivity timeout of the microservice is lifted.

According to another feature, the key/value system and the notification system are systems external to the communication system which are integrated into an executable code of the communication system, or injected at runtime of the system.

Another object of the present invention is also a method for reliably accessing and deploying ephemeral microservices on a heterogeneous computing platform.

This object is achieved by the method for accessing and deploying ephemeral microservices on a heterogeneous platform, by a communication system according to one of the features of the present invention, comprising the following steps:

depositing one or several microservice(s) by the developer on one or several execution node(s);
referencing microservices by the filename deposited without its extension in the key/value system;

storing microservices, in the form of a Jar or Javascript-type execution file, by the key/value system in the distributed storage unit;

dearchiving, into use or execution classes, Jar format execution files by the key/value system to make them accessible to the classloader of the Java runtime environment of the execution node, and the JavaScript formats of the execution files are stored unitarily on the key/value system so that the Java runtime environment can read or use the data as needed;

loading the classes associated with the microservices by the classloaders of the execution nodes to be loaded;

unloading the microservices by the execution nodes when the microservices are unused or when the load inactivity timeout of the microservice(s) is lifted.

According to another feature, the step of unloading the microservices comprises a selection by the host server of the execution nodes of the microservice to be loaded and each execution node reports data in the form of a score and allocation address of the microservice in a distributed memory cache of the communication system so that the host server can read and use these data.

According to another feature, the method further comprises a step of creating the aliases to the microservices by the developer so that the system can locate the microservice(s) to be deployed.

According to another feature, when the microservice is not loaded, the communication system chooses the execution node that loads the microservice in a new classloader and references it in the distributed storage unit of the system.

According to another feature, the reloading of microservice is done either by depositing a new microservice with the same execution filename or by changing the alias.

According to another feature, the reloading of a microservice results in a message sent by the publication and subscription system to update all the actions of the execution nodes of the communication system.

Other features and advantages of the present invention are detailed in the following description.

DESCRIPTION OF THE ILLUSTRATIVE FIGURES

Other features and advantages of the present invention will appear more clearly upon reading the description below, given with reference to the appended drawings, in which.

DESCRIPTION OF THE PREFERRED EMBODIMENTS OF THE INVENTION

The invention, with reference to FIGS. 1 and 2, will now be described.

The present invention relates to a communication system allowing easy, elastic (that is to say modular according to application needs and as quickly as possible), automatic and self-regulating access to and deployment of ephemeral microservices, based on the Java language, on a heterogeneous computing platform.

Figure 1:
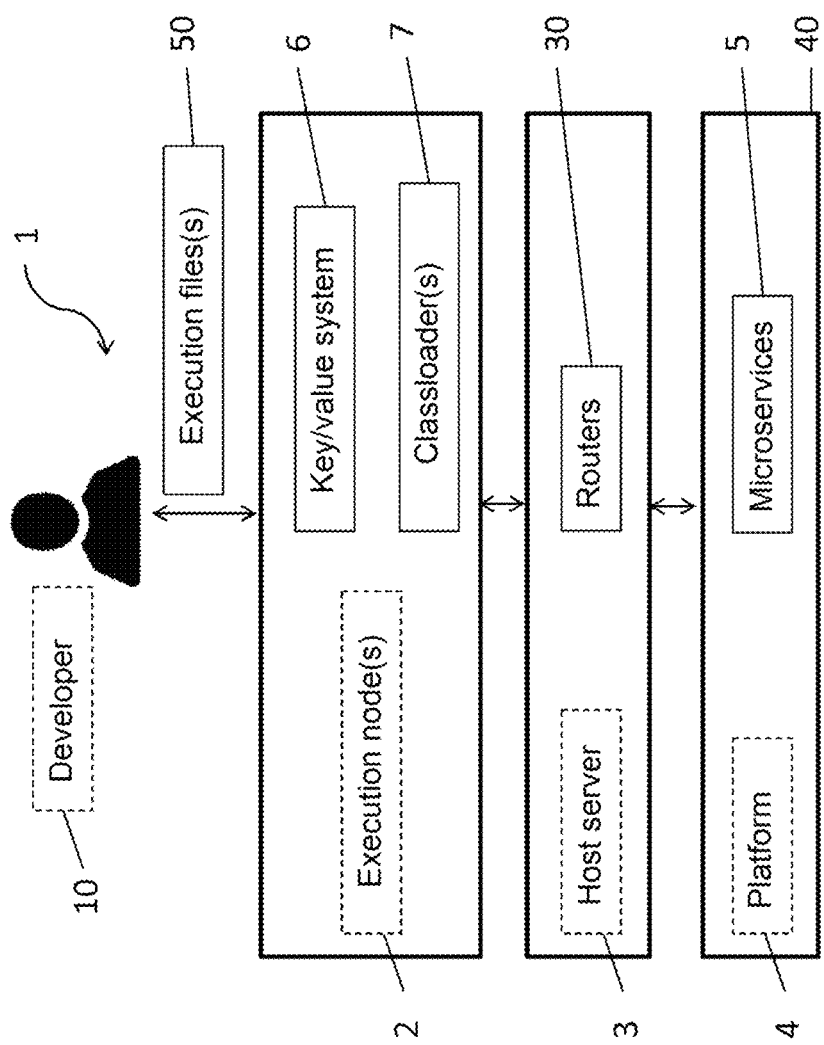
FIG. 1 represents a global diagram of a communication system according to one embodiment.

For example, as represented in FIG. 1, the communication system (1) comprises:

at least one execution node (2) supporting the microservice (5) runtime environment;

at least one computer device, called "host server" (3), comprising an external public entry point or edge used to control the communication system or to send thereto or retrieve therefrom information of the communication system by an external user;

a heterogeneous computing platform (4) comprising a set (40) of hardware and software or executable code for accessing and deploying microservices (5) on the system (1) in a Java runtime environment (J) disposed both on the host server (3) and the execution nodes (2) in order to be able to execute computer programs based on the Java language.

Figure 2:
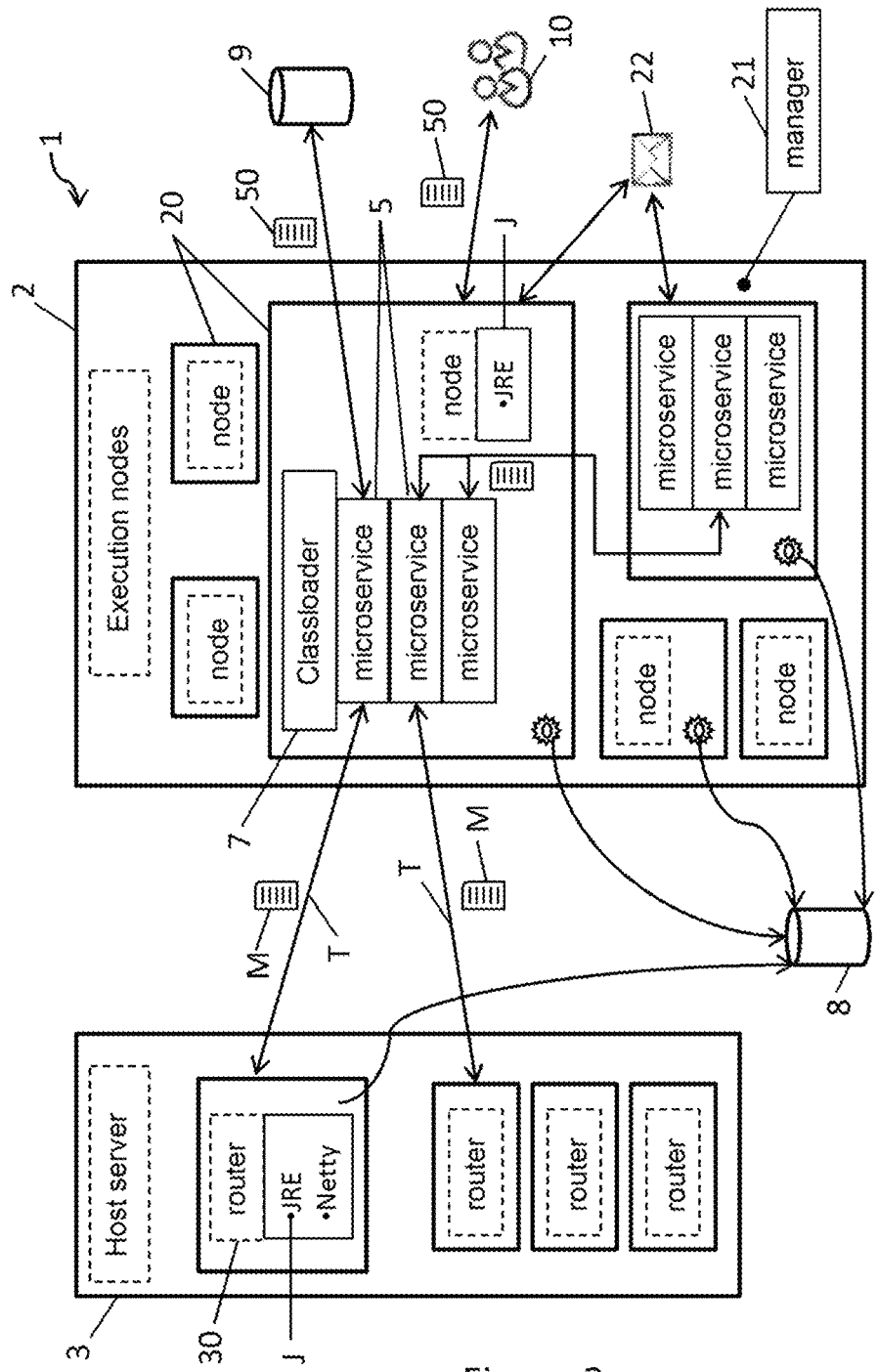
FIG. 2 represents a diagram of the communication system with the various components that can intervene in the access to and deployment of ephemeral microservices according to one embodiment.

In some embodiments, the host server (3) comprises several routers (30) constituting an intermediate communication interface between each execution node (2) and the outside of the communication system (1), as represented for example in FIGS. 1 and 2. In some embodiments, the routers (30) of the host server (3) use Java and Netty-based applications to ensure multi-protocol communications to the outside of the system and asynchronous TCP protocol exchanges towards the execution nodes (2) of the system (1). Thus, several external access protocols (i.e. via internet) can be managed by the system (1) through the use of the Netty framework, such as HTTP(S) (HyperText Transfer Protocol Secure), MQTT (Message Queuing Telemetry Transport), Websocket, TCP or FTP (File Transfer Protocol).

In some embodiments, the communication system (1) allows the creation of ephemeral microservices (5) by the use of a key/value system (6) stored in at least one distributed memory cache (8) (for example and without limitation the Redis or Hazelcast databases) at each creation by referencing each microservice (5) by filenames deposited in the system (1) by a developer (10) and using an asynchronous TCP exchange protocol (T) exchanging notifications containing metadata (M) between the host server (3) and each execution node (2). The communication via the asynchronous TCP protocol allows performance and memory gains since it limits the number of execution task or thread/instruction required between the host server and the nodes.

In some embodiments, when the developer (10) deposits a microservice (5) on the system (1), a selection of one or several execution node(s) (2) of the microservice is made by a specific algorithm which uses, for example, Native-Memory, MetaSpace, TotalHeap or CPU (Central Processing Unit). The algorithm, for each node (2), thus determines a score (or a value) and stores this score and an allocation address (key) or an alias of the microservice in the cache (8). This information (key, value) is stored in the distributed memory cache (8) if the score is more relevant than the previous one and the host server can read this information and choose the execution node (2). The distributed memory cache (8) can be used by the host server (for example to identify the least loaded node) and updated by the execution nodes (for example to be able to distribute the load between the nodes made by the algorithm).

In some embodiments, the data at the entry of the system (1) can be reformatted into a standard message which is exchangeable and modifiable by all of the microservices (5) and their exported functions can be implemented. This message contains metadata (M) integrated by the host server (3), such as for example an alias or identifier or key of the microservice so that the system can identify which microservice to use, a location path of a particular method in the microservice and an action associated with the location path; and/or by the execution nodes (2), such as for example a microservice execution return code and a microservice execution content type. In the case of the location path, for example, a «manageUser( )» method can be searched by the «/user» path. In the case of an action associated with the location path, for example, an action can be specified (such as creation or deletion): «createUser( )» method by the «/user» path and a «POST» action or «deleteUser( )» method by the «/user» path and a «DELETE» action. The communication system has the advantage of accessing and deploying several types of content (source file, work, presentation, script, image, audio, video, etc.). Furthermore, the microservices of the present invention can make it possible to activate any type of action (without quantitative restriction) since a microservice is capable of executing a code provided by a developer (depending on the customer or provider need).

In some embodiments, each node (2) stores execution files (50) of the microservice(s) (5), which can be deposited by the developer (10) and which include access to the system (1) by at least one of the two entry points either at the host server (3) or at the execution node (2). For example, these execution files can contain a name of a path or a localization method in the microservice. In the case of Jar format files, for example, a nomenclature similar to Jax-rs (Java API for RESTful Wab Services and referring to a Java programming interface to create web services with a REST architecture) can be used: use of the url path (or address on the web) to locate the method to be used («@Path»), rewriting of the sub-elements of the url path («@PathParam»), use of verbs or vocabularies of access to the resources («@GET», «@POST», «@DELETE», «@PUT»).

In some embodiments, each node (2) comprises at least one classloader (7) ensuring the deployment of the services associated with the microservices (5) which are integrated into the execution node (2), as represented for example in FIGS. 1 and 2. In some embodiments, the system (1) is able to select an execution node (2) so that it loads a microservice (5) in the classloader (7) which is referenced in a distributed storage unit (9) according to the alias used in the exchange metadata (M). Thus, the management by the Java classloader can allow loading and reloading without service interruption, in order to obtain a fast rollback (a method allowing to cancel all the requests made). In some embodiments, the developer (10) can also create aliases to the microservices (5).

Note that a Java runtime environment comprises internal container management (for example a ClassLoader) which is non-existent in other language protocols (in particular C language). The Java classloader can allow isolating secure execution areas, for example objects created by a microservice cannot be accessible by another microservice executed within the same JVM machine.

In some embodiments, the key/value system (6) is stored in the distributed memory cache (8) and the distributed storage unit (9), for example and without limitation the Redis, Cassandra, Aerospike, etc. databases. The key/value system (6) allows storing the microservices (5) or the execution files (50) of the microservices in the Jar format or in the form of a simple Javascript file. In some embodiments, the system (1) dearchives the Jar format files into use or execution classes to make them accessible to the classloader (7) of the Java runtime environment (J) of the execution node (2). The other files (Javascript) are stored unitarily based on the key/value system (6) so that the Java runtime environment (J) can read or use the data as needed. The classloader (7) can load the microservices (5) from the distributed storage unit (9) according to the query or request of the host server (3), defined by the service alias which allows identifying the microservice to be loaded and the path of the incoming request allows identifying the method (Java or Javascript) to call in the loaded microservice.

Note that the hashmap of the prior art references a class or package by indicating that the communication system is already in possession of said class. Unlike the prior art, the information contained in the hashmap of the present invention, may include a link towards the code to be executed (jar or js). Thus, the communication system of the present invention, which has not yet loaded said code, cannot know/determine which class to use.

In some embodiments, the algorithm of the execution nodes (2) is able to launch an inactivity timeout at each score determination. This allows the host server (3) to use and reuse the same execution node (2), thanks to the specific algorithm of the execution node, as long as the microservice is unused or an inactivity timeout is lifted. Indeed, each microservice call can lead to calls to other microservices whether it is on the same execution node or on another node of the system. As a result, the microservice can comprise a particular method to associate all of these responses into one, in order to retrieve each of these calls to generate only one response to the caller.

In some embodiments, if the microservice (5) is not loaded, the system (1) chooses the execution node (2). The node (2) called by the host server (3) of the system (1) loads the microservice into a new classloader (7) which is referenced by the system in a HashMap of the distributed memory cache (8) according to the alias used in the standardized exchange message.

In some embodiments, the call to the microservice (5) is made by a unique referencing name or alias. For example, this alias may be a web domain name and in the case of an HTTP request on the host server (3), it is the name of "host" (header of the computer file in the HTTP1.1 protocol) that can be used to find the associated microservice.

In some embodiments, the host server (3) and the execution nodes (2) are multipliable, without any particular configuration, by one or several manager(s) of the system (1). This configuration allows the administrator or developer of the platform to limit the specific modifications or settings of the parameters by server or by computer architecture for the implementation of the system.

In some embodiments, the system (1) can comprise a microservice development tool to constitute a development interface (for example, via an application programming interface) for the developer (10) and/or a sending tool in the protocol used between the microservice and the host server.

In some embodiments, each execution node (2) can further comprise computer means (21) for managing microservices, computer means for reading and writing the execution files disposed in a distributed storage unit (9) of the system (1), and a system (22) for publishing and subscribing a message (which can be a notification system) when a microservice (5) is deposited or an alias is modified by the developer (10) on the system (1). In some embodiments, the service reloading is done either by alias loading, or by depositing in the system a new microservice with the same name. The microservice deposition or the alias modification therefore results in a message sent via the publication/subscription system which results in an action on all the nodes of the communication system.

In some embodiments, the key/value system (6) and the notification system can be systems external to the communication system (1) which can be integrated into an executable code of the communication system, or injected at runtime of the system by a manager of the system. This configuration has the advantage of making the communication system of the present invention, at the same time independent and scalable with respect to the external systems. Thus, the administrator of the system is not bound to the external system chosen, for example the administrator can preferably use and easily control the storage unit distributed by a Cassandra-type rather than Redis-type database. The administrator can also, on the one hand, easily change the external components according to the instantiation of the desired platform and, on the other hand, optimize the communication system by adding without constraint, for example without modifying the architecture or the executable codes of the system, a new notification system or a more efficient key/value system.

In some embodiments, the system can delete the entries in the HashMap from the distributed memory cache (8), when the load inactivity timeout is lifted or during the reloading of the microservice. This will allow them to be eliminated by the Garbage Collector Java (memory garbage collector which determines the objects that cannot be used by the program to recover the space used by these objects). In case of microservice reloading, the deployed or loaded files from the Jar will also be deleted from the key/value system. In some embodiments, if there is no longer a link between the microservices loaded by the classloader and the Java runtime environment, the classloader can be automatically deleted by the Garbage Collector Java, so that the multiple reloading of a microservice does not cause an impact on the used resources.

In some embodiments, the use of a microservice (5) can be activated by at least one access code disposed either at the level of the service (for example by an annotation «@DisableSecurity»)) allowing access to all the resources of the service (for example «@DisableSecurity({"/.*"})»), either at the level of a resource (for example «@Authentication (false)» of the service allowing access to this single resource, or by at least one access method predefined by a security manager of the communication system. Indeed, initially the call of an unauthorized microservice results in an error return code to the host server. At the level of the execution nodes, each call of a microservice must therefore be authorized in order to deploy the microservice on the platform. This allows access to the secure microservice in the communication system.

The present invention also relates to a method for accessing and deploying ephemeral microservices (5) on a heterogeneous computing platform (4), by the communication system (1) according to one of the embodiments of the present invention.

In some embodiments, as represented for example in FIG. 2, the method comprises the following steps:
  depositing one or several microservice(s) (5) by the developer (10) on one or several execution node(s) (2);
  referencing the microservices (5) by the filename deposited without its extension in the key/value system (6);
  storing the microservices (5), in the form of a Jar or Javascript-type execution file (50), by the key/value system (6) in the distributed storage unit (9);
  dearchiving, into use or execution classes, the Jar format execution files (50) by the key/value system (6) to make them accessible to the classloader (7) of the Java runtime environment (J) of the execution node (2), and the JavaScript format of the execution files (50) are stored unitarily on the key/value system (6) so that the Java runtime environment (J) can read or use the data as needed;
  loading the classes associated with the microservices (5) by the classloaders (7) of the execution nodes (2) to be loaded;
  unloading or deploying the microservices (5) by the execution nodes (2) when the microservices (5) are unused or when the load inactivity timeout of the microservice(s) (5) is lifted.

In some embodiments, the step of unloading the microservices (5) comprises a selection by the host server (3) of the execution nodes (2) of the microservice to be loaded and each execution node (2) reports data in the form of a microservice allocation score and address in a distributed memory cache (8) of the communication system (1) so that the host server (3) can read and use these data.

In some embodiments, the host server (3) chooses the execution node (2) by three different processes:
  in the case where, the host server does not comprise information on an execution node for a given microservice, the host server addresses the distributed memory cache to retrieve the information from the most relevant node, then addresses this node so that the latter loads the microservice.
  in the case where, the host server already comprises information on an execution node for a given microservice, and the microservice is not used (that is to say the communication between the host server and the microservice is not used), the host server reuses this microservice;
  in the case where, the host server already comprises information on an execution node for a given microservice, and the microservice is used by this host server (that is to say the communication between this host server and this microservice is used or a request is in progress), the host server instantiates a new microservice to communicate with the execution node (as in the case of the first process described above).

In some embodiments, the method further comprises a step of creating aliases to the microservices (5) by the developer (10) so that the system can locate the microservice(s) (5) to be deployed.

In some embodiments, when the microservice (5) is not loaded, the communication system (1) chooses (for example via the host server) the execution node (2) which loads the microservice (5) in a new class loader (7) and references it in the distributed storage unit (9) of the system.

In some embodiments, the reloading of microservices (5) is done either by depositing a new microservice with the same execution filename, or by changing the alias.

In some embodiments, the reloading of microservice (5) results in a message sent by the publication and subscription system (22) to update all the actions of the execution nodes (2) of the communication system (1).

In some embodiments, the deployment or the update of a microservice is carried out by the developer who deposits the microservice (for example, by a man-machine interface (MMI) or an application programming interface (API) which can be integrated into the execution node) in the distributed storage unit, so that the publication/subscription system informs of the deployment or update of the microservices on all the execution nodes.

The communication system and the method for accessing and deploying ephemeral microservices on a heterogeneous platform using this communication system, according to one of the embodiments of the present invention, allow the developer not to have to apprehend the hidden underlying technical infrastructure problems. Indeed, the developer can simply deposit the microservice (for example a Jar file for the Java or a simple file for the Javascript) in one of the execution nodes of the system (for example by a simple HTTP request). The developer can thus dynamically instantiate and deploy the access to and deployment of the microservices. The communication system also allows deployment on any type of technical environment (of the ARM card with RISC hardware architectures (referring to a reduced instruction set processor) at the computation servers) supporting a Java runtime environment. In addition, this communication system can be used in the field of Internet of Things by limiting the investment costs (for example by investing on modular and reusable components) and by evolving in a selective manner. Finally, the method according to the invention allows secure access to and deployment of microservices on the heterogeneous platform in an entirely agnostic manner of the media and/or access network used by the developer or the user.

The present application describes various technical characteristics and advantages with reference to the figures and/or to various embodiments. Those skilled in the art will understand that the technical characteristics of a given embodiment may in fact be combined with characteristics of another embodiment unless the reverse is explicitly mentioned or it is obvious that these characteristics are incompatible or that the combination does not provide a solution to at least one of the technical problems mentioned in the present application. In addition, the technical characteristics described in a given embodiment can be isolated from the other characteristics of this mode unless the reverse is explicitly mentioned.

It should be obvious to those skilled in the art that the present invention allows embodiments in many other specific forms without departing from the field of application of the invention as claimed. Consequently, the present embodiments should be considered by way of illustration, but can be modified in the field defined by the requested protection, and the invention should not be limited to the details given above.

The invention claimed is:

1. A communication system comprising one or several execution node(s) able to execute one or several microservice(s), a computer device, called a host server, including several routers constituting an intermediate communication interface between each execution node and the outside of the communication system, a heterogeneous computing platform, consisting of comprising a set of hardware and software or executable code for the access to and deployment of microservices on the system, each node stores execution files of the microservice(s) including the access to the system by at least one of two entry points either at the host server or at the execution node and the communication system being characterized in that wherein the set of hardware and software or executable code for the access to and deployment of the microservices is in a Java runtime environment (J) on the host server and the execution nodes allowing the execution of the computer programs based on the Java language and in that it allows the creation of ephemeral microservices by the use of a key/value system stored in a distributed memory cache at each creation by referencing each microservice by filenames deposited in the system by a developer and using an asynchronous TCP exchange protocol (T) exchanging notifications containing metadata (M) between the host server and each execution node; and in that at least one classloader in the Java environment ensures the deployment of the services associated with the microservices that are integrated into the execution node.

2. The system according to claim 1, wherein the host server and the execution nodes of the system exchange metadata (M) type data comprising one or several of the following elements: an alias of the microservice (called key), a location path of a particular method in the microservice, an action associated with the location path, a microservice execution return code and a microservice execution content type.

3. The system according to claim 1, wherein a microservice development tool constitutes a developer interface and a sending tool in the protocol used between the microservice and the host server.

4. The system according to claim 1, wherein each execution node further comprises computer means for managing the microservices, computer means for reading and writing the execution files disposed in a distributed storage unit of the system, and a system for publishing and subscribing a message when a microservice is deposited or an alias is modified by the developer on the system.

5. The system according to claim 1, wherein each execution node is able to execute a predetermined algorithm dedicated to the selection of one or several execution node(s) of the microservice by determining a score (value) and then storing the address or alias of the microservice and this score (key/value system) in the distributed memory cache if the score is more relevant than the previous one.

6. The system according to claim 5, wherein the predetermined algorithm executed by the execution node launches an inactivity timeout at each score determination so that the host server reuses the same execution node as long as the microservice is unused or an inactivity timeout is lifted.

7. The system according to claim 1, wherein the execution node chosen by the host server called by the system, loads the microservice in a new classloader referenced within the system, in a HashMap of the distributed memory cache according to the alias used in the standardized exchange message.

8. The system according to claim 5, wherein each selected execution node is able to report data in the form of a score and address allocation in the distributed memory cache of the communication system allocated to each microservice so that the host server can read and use these data.

9. The system according to claim 1, wherein the routers of the host server integrate Java and Netty-based applications to ensure multiprotocol communications to the outside of the system and asynchronous TCP protocol exchanges (T) towards the execution nodes of the system.

10. The system according to claim 1, wherein the microservices are stored in Jar or Javascript format by the system in the distributed memory cache, while the Jar format files are dearchived into use or execution classes by the system to make them accessible to the classloader of the Java runtime environment (J) of the execution node; so that these microservices are loaded from the distributed storage unit according to the request of the host server (defined by the service alias that allows identifying the microservice to be loaded) and the path of the incoming request allowing to identify the method (java or javascript) to call in the loaded microservice); and the other file formats are stored unitarily on the key/value system so that the Java runtime environment (J) can read or use the data as needed.

11. The system according to claim 4, wherein the system is able to select an execution node so that it loads a microservice in a classloader which is referenced in the distributed storage unit according to the alias used in the exchange metadata (M).

12. The system according to claim 1, wherein the system includes at least one access code for a call activation of a microservice for its deployment on the platform, said access code is disposed either at the level of the service allowing the access to all the resources of the service, or at the level of a resource of the service allowing the access to this single resource, or by at least one access method predefined by a security manager of the communication system.

13. The system according to claim 5, wherein the host server (3) is configured to use and reuse the same execution node (2), by means of the specific algorithm of the node (2), as long as the microservice (5) is unused or a load inactivity timeout of the microservice (5) is lifted.

14. The system according to claim 1, wherein the key/value system and the notification system are systems external to the communication system which are integrated into an executable code of the communication system, or injected at runtime of the system.

15. A method for accessing and deploying ephemeral microservices on a heterogeneous computing platform, by a communication system according to claim 1, wherein the method comprises the following steps:
depositing one or several microservice(s) by the developer on one or several execution node(s);
referencing microservices by the filename deposited without its extension in the key/value system;
storing microservices (5), in the form of a Jar or Javascript-type execution file, by the key/value system in the distributed storage unit;
dearchiving, into use or execution classes, Jar format execution files by the key/value system to make them accessible to the classloader of the Java runtime environment (J) of the execution node, and the JavaScript formats of the execution files are stored unitarily on the key/value system so that the Java runtime environment (J) can read or use the data as needed;
loading the classes associated with the microservices by the classloaders of the execution nodes to be loaded;
unloading the microservices by the execution nodes when the microservices are unused or when the load inactivity timeout of the microservices is lifted.

16. The method according to claim 15, wherein the step of unloading the microservices comprises a selection by the host server of the execution nodes of the microservice to be loaded and each execution node reports data in the form of a score and allocation address of the microservice in the distributed memory cache of the communication system so that the host server can read and use these data.

17. The method according to claim 15, wherein the method further comprises a step of creating the aliases to the microservices by the developer so that the system can locate the microservice(s) (or 5) to be deployed.

18. The method according to claim 15, wherein when the microservice is not loaded, the communication system chooses the execution node that loads the microservice in a new classloader and references it in the distributed storage unit of the system.

19. The method according to claim 17, wherein the reloading of microservice is done either by depositing a new microservice with the same execution filename, or by changing the alias.

20. The method according to claim 15, wherein the reloading of a microservice results in a message sent by the publication and subscription system to update all the actions of the execution nodes of the communication system.

* * * * *